United States Patent
Sugimoto et al.

(10) Patent No.: US 6,927,683 B2
(45) Date of Patent: Aug. 9, 2005

(54) VEHICULAR TURN SIGNAL INDICATOR SYSTEM AND FLASHER CIRCUIT FOR THE SAME

(75) Inventors: Shigekazu Sugimoto, Takahama (JP); Yoshichika Abe, Anjo (JP)

(73) Assignees: Anden Co., Ltd., Anjo (JP); Denso Corporation, Kariya (JP)

( * ) Notice: Subject to any disclaimer, the term of this patent is extended or adjusted under 35 U.S.C. 154(b) by 85 days.

(21) Appl. No.: 10/705,958

(22) Filed: Nov. 13, 2003

(65) Prior Publication Data

US 2004/0095234 A1 May 20, 2004

(30) Foreign Application Priority Data

Nov. 15, 2002 (JP) ........................................ 2002-332563

(51) Int. Cl.$^7$ ............................................... B60Q 1/34
(52) U.S. Cl. ........................ 340/475; 340/458; 315/77; 362/545
(58) Field of Search ................................ 340/458, 475, 340/464, 463, 465, 468, 478, 815, 45; 315/77, 200 A; 362/545

(56) References Cited

U.S. PATENT DOCUMENTS

| | | | | |
|---|---|---|---|---|
| 4,910,496 A | * | 3/1990 | Hatanaka et al. | ........... 340/458 |
| 5,374,920 A | * | 12/1994 | Evens | ......................... 340/475 |
| 5,872,511 A | * | 2/1999 | Ohkuma | ...................... 340/471 |
| 5,929,569 A | * | 7/1999 | Sueoka | ......................... 315/77 |
| 6,031,451 A | * | 2/2000 | Graves et al. | .............. 340/468 |
| 6,243,009 B1 | * | 6/2001 | Fritz et al. | .................. 340/471 |
| 6,844,681 B2 | * | 1/2005 | Serizawa et al. | ............. 315/77 |

FOREIGN PATENT DOCUMENTS

| JP | A-2001-244087 | 9/2001 |
|---|---|---|
| JP | A-2002-362220 | 12/2002 |

* cited by examiner

*Primary Examiner*—Brent A. Swarthout
(74) *Attorney, Agent, or Firm*—Posz Law Group, PLC

(57) ABSTRACT

A flasher circuit included in a vehicular turn signal indicator system has a flashing control circuit, a flashing relay, a current detecting resistor, and a switching circuit. The control circuit detects a voltage drop across the resistor during driving of light bulb indicator lamps and light emitting diode (LED) indicator lamps of the system. Each LED lamp is configured to output a disconnection signal if at least one of their LEDs is disconnected during the driving. The signal turns on a transistor of a switching circuit, resulting in short across the resistor. As a result, the voltage drop is lowered equal to or under the threshold value, and the control circuit starts the disconnection detection.

4 Claims, 5 Drawing Sheets

VEHICULAR TURN SIGNAL INDICATOR SYSTEM AND FLASHER CIRCUIT FOR THE SAME

CROSS REFERENCE TO RELATED APPLICATION

This application is based on and incorporates herein by reference Japanese Patent Application No. 2002-332563 filed on Nov. 15, 2002.

FIELD OF THE INVENTION

The present invention relates to a vehicular turn signal indicator system and a flasher circuit for the turn signal indicator.

BACKGROUND OF THE INVENTION

Vehicular turn signal indicator systems using light emitting diodes (LEDs), power consumption of which is lower than that of light bulbs, have become commercially practical. An example of such systems is shown in FIG. 5. The system includes two LED lamps: a left rear LED lamp 800a for a left rear turning signal indicator and a right rear LED lamp 800b for a right rear turning signal indicator. When a hazard warning switches 620a and 620b are turned on, a flashing control circuit 500c performs control for flashing front indicator lamps 810a, 810b and the rear LED lamps 800a, 800b.

In this system, a current flowing through a current detecting resistor 520 does not significantly vary when an LED is disconnected. Therefore, it is difficult to detect the disconnection of the LED.

To properly detect the disconnection, current correction circuits 710a, 710b are connected. The current correction circuit 710a, 710b supply a pseudo current to the LEDs so that a proper size of current for the disconnection detection flows through the resistor 520. A disconnection detecting circuit is provided for each LED lamp 800a, 800b. The disconnection detecting circuit outputs a signal indicative of the disconnection to a current shutoff circuit 700a, 700b. When the signal is inputted, the shutoff circuit 700a, 700b shuts off the current supply to the current correction circuit 710a, 710b.

With the above configuration, the disconnection detection is properly performed for the indicator lamps constructed of LEDs. However, the current correction circuits 710a, 710b consume a large amount of power and produce a large amount of heat.

SUMMARY OF THE INVENTION

The present invention therefore has an objective to provide a vehicular turn signal indicator system having indicator lamps constructed of LEDs in which disconnection of the LEDs is detected without the above-described current correction circuit. The present invention has another objective to provide a flasher circuit for the vehicular turn signal indicator system for driving the indicator lamps and detecting the disconnection of the indicator lamps.

A vehicular turn signal indicator system of the present invention includes a first indicator lamp, a second indicator lamp, and a flasher circuit. The first indicator lamp is constructed of a light bulb. The second indicator lamp is constructed of LEDs and a disconnection detecting circuit for detecting disconnection of the LEDs and outputting a signal indicative of the disconnection. The flasher circuit intermittently supplies currents to the first and the second indicator lamps to flash.

The flasher circuit includes a driving means, a current detecting resistor, a flashing control circuit, and a shorting circuit. The driving means drives the first and the second indicator lamps to flash by supplying currents to the lamps. The current detecting resistor is connected in a power supply line of the first and the second indicator lamps for the disconnection detection. The flashing control circuit performs a flashing control of the first and the second indicator lamps by outputting a control signal to the driving means during operation of the lamps.

Furthermore, the flashing control circuit detects a voltage drop across the current detecting resistor. If the voltage drop is equal to or lower than a threshold value, the circuit determines disconnection of at least one of the indicator lamps. If the voltage drop becomes equal to or under a threshold value during operation of the first and the second indicator lamps, the circuit determines the disconnection. The shorting circuit shorts across the resistor according to the disconnection signal outputted from the second indicator lamps. With this operation, the voltage drop is lowered equal to or under the threshold value.

The disconnection is detected without the current correction circuit. Although the shoring circuit is added, its construction is simpler than that of the current correction circuit. Namely, the disconnection of the LEDs is properly detected with a simple configuration.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
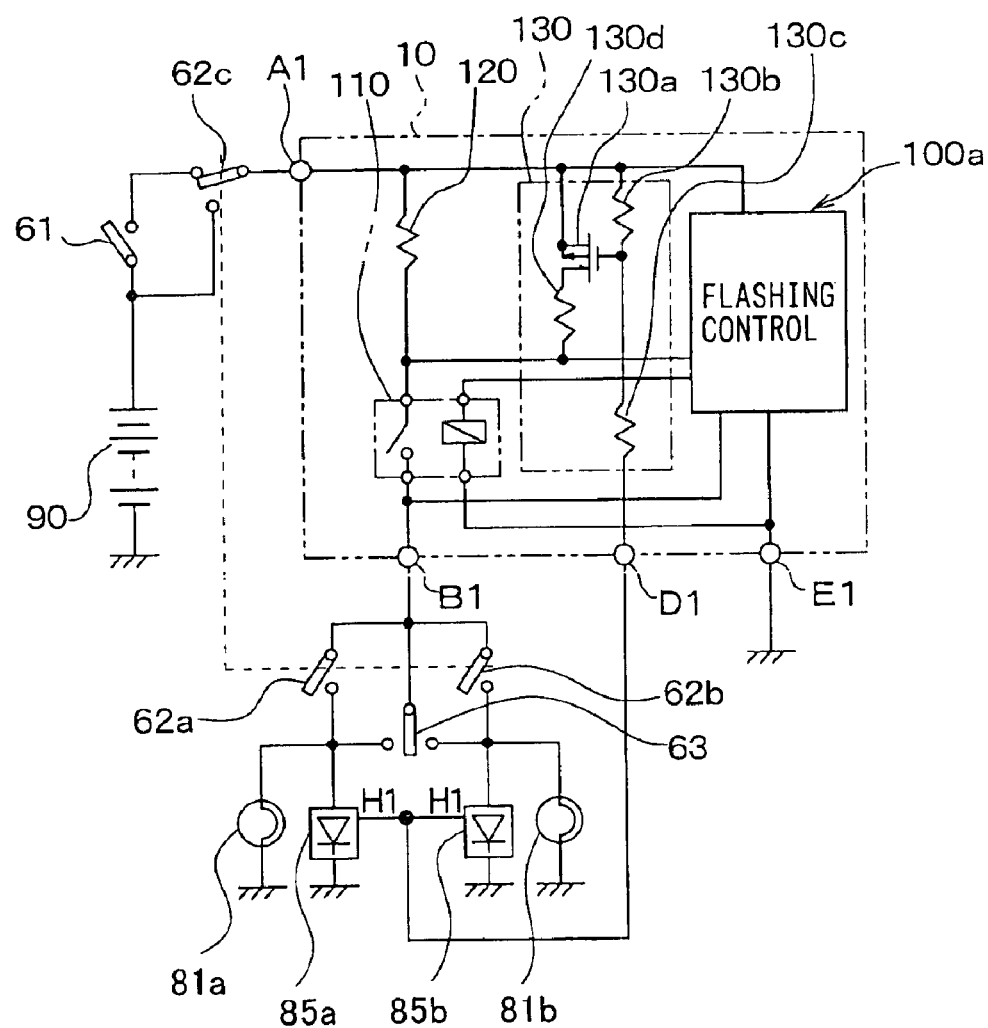
FIG. 1 is a circuit diagram of a vehicular turn signal indicator system according to the first embodiment of the present invention.

The preferred embodiments of the present invention will be explained with reference to the accompanying drawings. In the drawings, the same numerals are used for the same components and devices.

[First Embodiment]

Referring to FIG. 1, a vehicular turn signal indicator system includes a flasher circuit 10, hazard warning switches 62a–62c, an indicator switch 63, left and right front bulb lamps 81a and 81b (first indicator lamp), and left and right LED lamps 85a and 85b (second indicator lamp). The hazard switches 62a–62c operate in response to manual switching operations performed by a driver.

The flasher circuit 10 has a power supply terminal A1 to which a power supply voltage supplied by the battery 90 is applied via the hazard switch 62c while an ignition switch 61 is turned on. An electrode voltage supplied by the battery 90 is applied to the terminal A1 via the hazard switch 62c while the ignition switch is turned off and the hazard switch 62c is turned on.

The flasher circuit 10 has a terminal B1 connectable to the left front lamp 81a and the left LED lamp 85a via the hazard switch 62a, and to the right front lamp 81b and the right LED lamp 85b via the hazard switch 62b. The terminal B1 is also connectable to the left front lamp 81a and the left LED lamp 85a, or the right front lamp 81b and the right LED lamp 85b via the indicator switch 63.

The flasher circuit 10 includes a flashing control circuit 100a, a flashing relay 110, a current detecting resistor 120, and a switching circuit 130. The flashing relay 110 has a coil and a contact, ends of which are connected to the terminal A1 via the resistor 120 and the terminal B1, respectively.

The flashing control circuit 100a detects a voltage at the terminal B1. If the detected voltage is equal to or under a predetermined threshold level, the control circuit 100a starts flashing control of the indicator lamps 81a, 81b, 85a, 85b. The control circuit 100a outputs flashing signals to the flashing relay 110 for driving the indicator lamps 81a, 81b, 85a, 85b to flash. More specifically, the control circuit 100a intermittently supplies currents to the coil of the flashing relay 110 in a predetermined cycle. The contact of the relay 110 opens and closes according to the intermittent current supply.

Furthermore, the control circuit 100a detects a voltage drop across the resistor 120 during the flashing control. If the voltage drop is equal to or under a threshold value, it determines that at least one of the indicator lamps is disconnected and decreases an opening-and-closing cycle of the contact.

The switching circuit 130 includes a p-type MOS transistor 130a (switching component) and resistors 130b, 130c, 130d. The switching circuit 130 functions as a shorting circuit for shorting across the resistor 120 when the transistor 130a turns on. The transistor 130a and the resistor 130d are connected in series with each other and in parallel with the resistor 120. A control terminal (gate) of the transistor 130a is connected to the terminal A1 via the resistor 130a and to a terminal D1 of the flasher circuit 10 via the resistor 130c. The resistors 130b and 130c are used for adjusting a voltage level of the control terminal. The resistor 130d is a current limiting resistor for limiting the current when the transistor 130a turns on. The resistance of the resistor 130d is set at a small valued with respect to that of the resistor 120.

The left and the right front lamps 81a and 81b are arranged at left and right front portions of the vehicle used as front turn signal indicators. If light bulbs with a voltage rating of 12V and power dissipation of 27W are used for the front lamps 81a, 81b, about a 2.1A current flows in each front lamp 81a, 81b.

Figure 2:
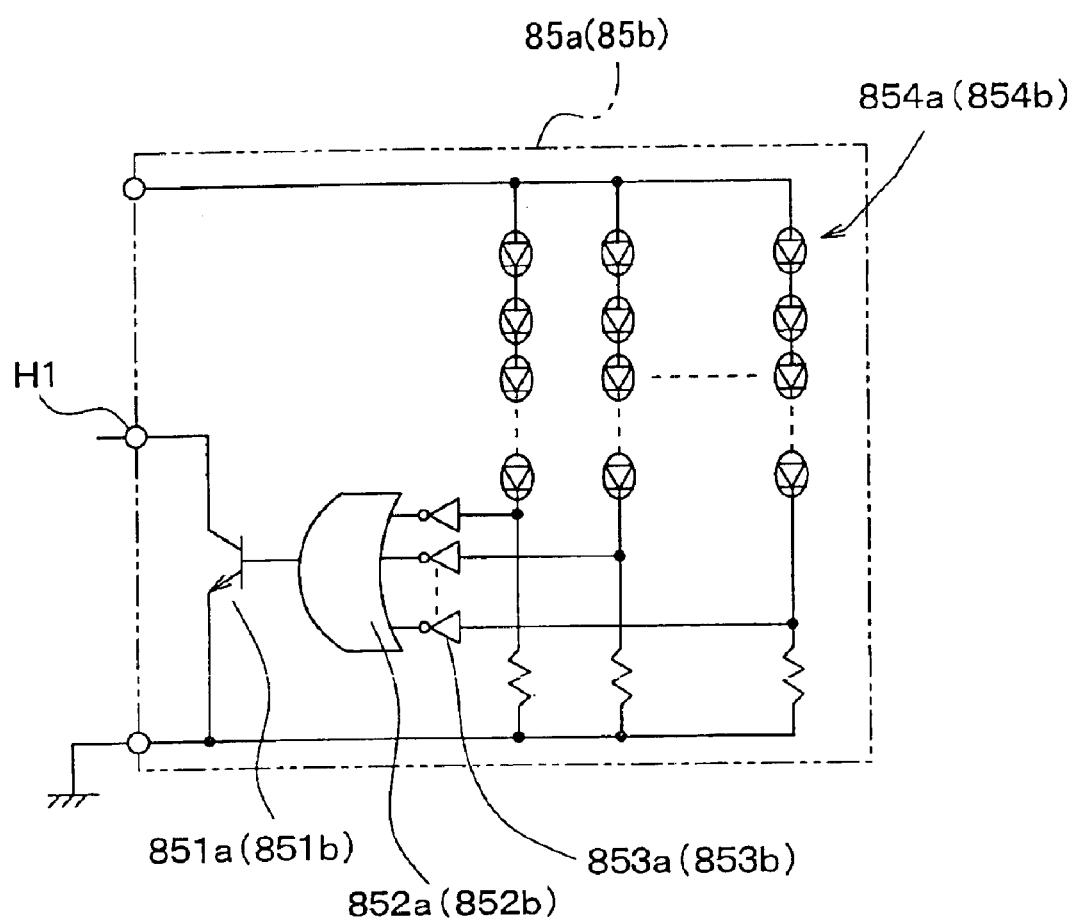
FIG. 2 is a circuit diagram of an LED lamp included in the vehicular turn signal indicator system shown in FIG. 1.

Referring to FIG. 2, the left and the right LED lamps 85a and 85b include LEDs 854a, 854b and disconnection detecting circuits. The disconnection detecting circuits are provided one for each LED lamp 85a, 85b for detecting the disconnection of the LEDs 854a, 854b. The left and the right LED lamps 85a and 85b are arranged at left and right rear portions of the vehicle. The disconnection detecting circuit is constructed of an inverter circuit 853a, 853b, an OR circuit 852a, 852b, and a transistor 851a, 851b.

If one or more LEDs 854a are disconnected, the transistor 851a connected to a terminal H1 of the LED lamp 851a turns on according to an output of the OR circuit 852a calculated from outputs of the inverter circuits 853a. As a result, the collector current starts flowing through the transistor 51a and the voltage level at the terminal D1 becomes low. Likewise, the voltage level at the terminal D1 becomes low when one of the LEDs 854b is disconnected.

Indicator lamps are arranged on left and right sides of a meter panel of the vehicle (not shown). The indicator lamp on the left is connected in parallel with the left front bulb 81a or the left LED lamp 85a. The indicator lamp on the right is connected in parallel with the right front bulb 81b or the right LED lamp 85b.

When the hazard switch 62a, 62b or the indicator switch 63 is turned on by the driver, the voltage at the terminal B1 becomes low. The control circuit 100a detects a voltage at the terminal B1. If the voltage is low, the control circuit 100a intermittently supplies currents to the coil of the relay 110. The relay 110 opens and closes in the predetermined cycle according to the intermittent current supply. With this operation, the indicator lamps 81a, 81b, 85a, 85b flash when the hazard switches 62a, 62b or the indicator switch 63 is turned on. Moreover, the control circuit 100a performs disconnection detection of the indicator lamps 81a, 81b, 85a, 85b by detecting a voltage drop across the resistor 120.

If the lamps 81a, 81b, 85a, 85b under flashing control are not disconnected, the current larger than a predetermined value flows through the resistor 120. As a result, the voltage drop across the resistor 120 is larger than the threshold value and the control circuit 100a does not perform the disconnection detection.

If one or more front indicator lamps 81a, 81b are disconnected, the voltage drop across the resistor 120 becomes equal to or smaller than the predetermined value. As a result, the control circuit 100a performs the disconnection detection. Moreover, the control circuit 100a controls flashing cycles of the indicator lamp 81a, 81b and the indicator lamps on the meter panel to notify the driver with the disconnection.

If one or more front lamps 81a, 81b and LED lamps 85a, 85b are disconnected, a disconnection signal indicative of the disconnection is outputted via the terminal H1. The disconnection signal turns the voltage level at the terminal D1 to low and turns on the transistor 130a. As a result, the voltage drop across the resistor 120 becomes equal to or smaller than the threshold value. More specifically, the transistor 130a shorts across the resistor 120 to decrease the voltage drop across the resistor 120 under the threshold value. As a result, the control circuit 100a performs the disconnection detection and notifies the driver with the disconnection in the same manner as the front indicator lamps 81a, 81b if the disconnection is detected.

[Second Embodiment]

Figure 3:
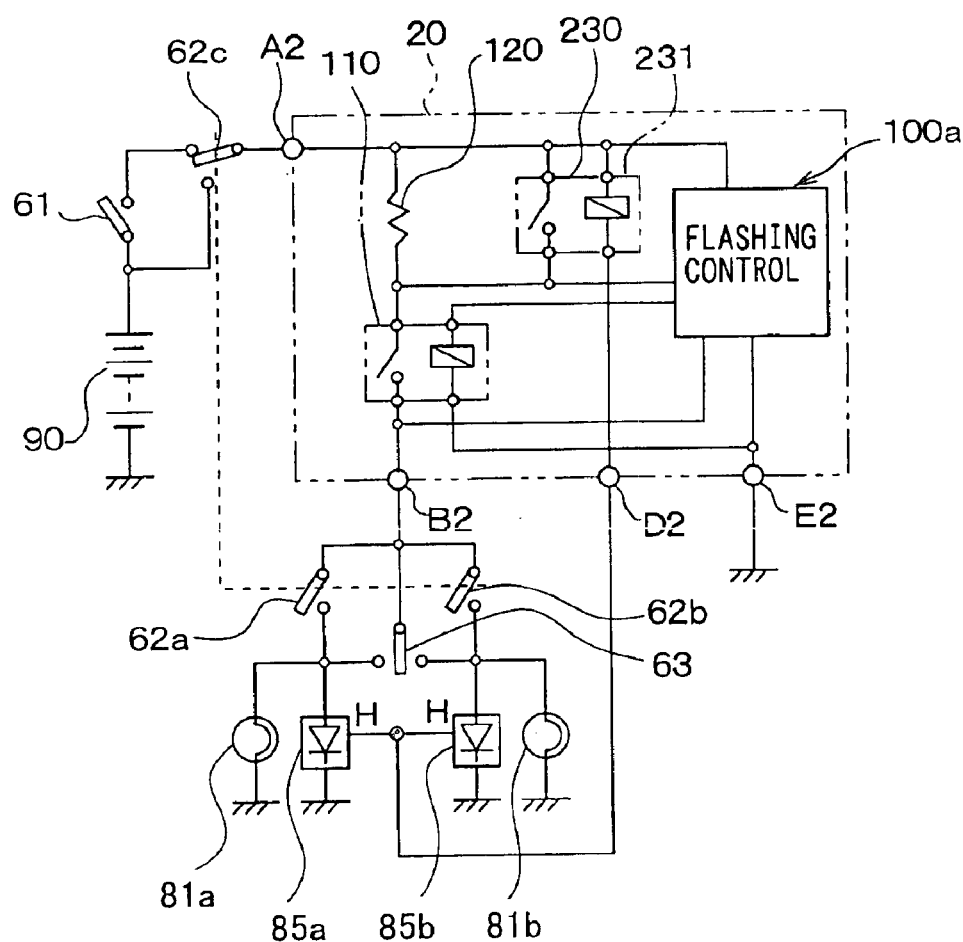
FIG. 3 is a circuit diagram of a vehicular turn signal indicator system according to the second embodiment of the present invention.

Referring to FIG. 3, a vehicular turn signal indicator system includes a flasher circuit 20 that has a switching circuit 230. The switching circuit 230 is an electromagnetic relay 231 that includes a coil and a contact, and functions as a shorting circuit for shorting across the resistor 120. The contact of the relay 231 is connected in parallel with the current detecting resistor 120. The coil is connected between a power supply terminal A2 and a terminal D2 of the flasher circuit 20. The contact is open or closed based on a disconnection signal outputted from the left and the right LED lamps 85a and 85b.

When the signal is outputted from at least one of the left and right LED lamps 85a and 85b, a voltage at the terminal D2 becomes low and the contact is closed. Namely, the resistor 120 is shorted and the voltage drop across the resistor 120 becomes lower than a threshold value set for the disconnection detection. As a result, the flashing control circuit 10a performs the disconnection detection in the same manner discussed in the first embodiment section.

[Third Embodiment]

Figure 4:
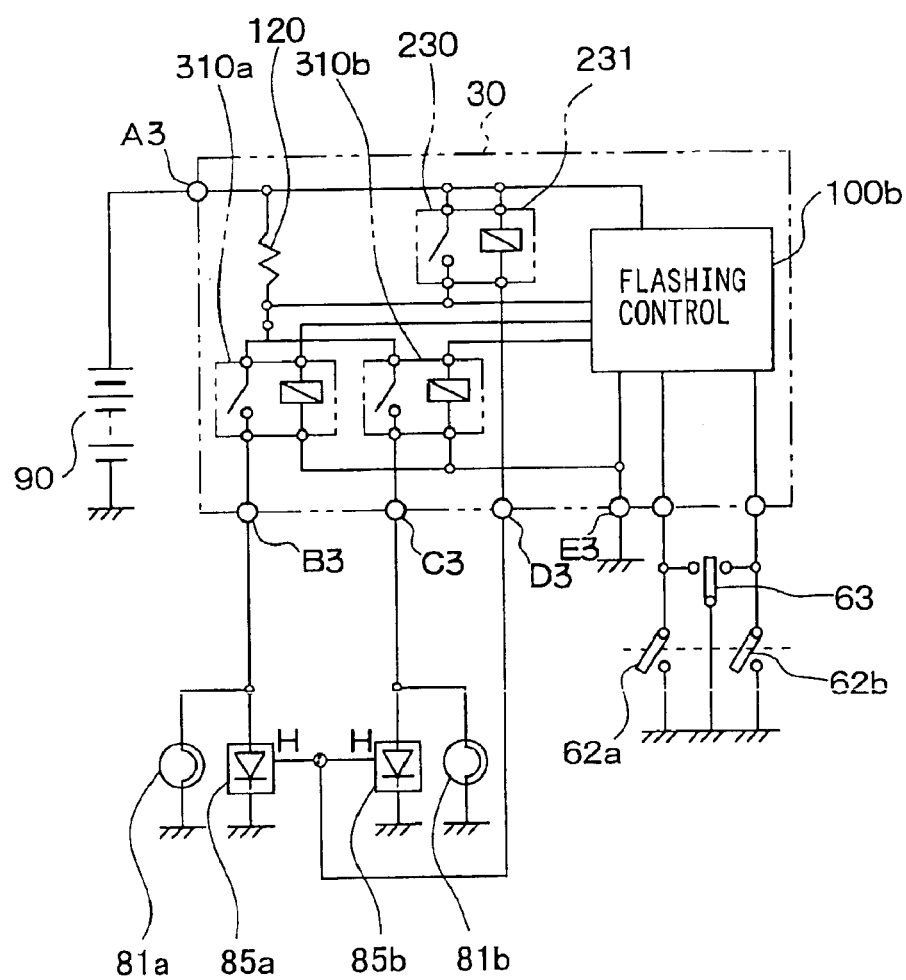
FIG. 4 is a circuit diagram of a vehicular turn signal indicator system according to the third embodiment of the present invention.

Referring to FIG. 4, a vehicular turn signal indicator system includes a flasher circuit 30 that includes the flashing control circuit 100b and left and right flashing relays 310a, 310b. The control circuit 100b receives a low-level signal when the hazard switches 62a, 62b or the indicator switch 63 is turned on. The control circuit 100b controls currents flow through coils of the left and the right flashing relays 310a, 310b, respectively. The hazard switches 62a and 62b operate concurrently with each other.

An end of the resistor 120 is connected to a power supply terminal A3 of the flasher circuit 30. Another end of the resistor 120 is connected to a terminal B3 of the flasher circuit 30 via the contact of the left flashing relay 110a and to a terminal C3 of the flasher circuit 30 via the contact of the right flashing relay 110b.

The terminal B3 is connected to the left front lamp 81a and the left LED lamp 85a, and the terminal C3 is connected to the right front lamp 81b and the right LED lamp 85b.

The control circuit 100b intermittently supplies currents to the left and the right flashing relays 310a, 310b when the hazard switches 62a, 62b are turned on. The left and the right flashing relays 310a, 310b are open or closed in a predetermined cycle for flashing the front lamps 81a, 81b and the LED lamps 85a, 85b. The control circuit 100b intermittently supplies currents to the coil of the left flashing relay 310a when the indicator switch 63 is turned to the left position. The left flashing relay 310a turns on and off in a predetermined cycle for flashing the left front lamp 81a and the left LED lamp 85a. Likewise, the control circuit 100b intermittently supplies currents to the coil of the right flashing relay 310b when the indicator switch 63 is turned to the right position. The right flashing relay 310b turns on and off in a predetermined cycle for flashing the right front lamp 81b and the right LED lamp 85b.

If a disconnection signal is outputted from at least one of the LED lamps 85a, 85b, the voltage at terminal D3 becomes low. As a result, the contact of the relay 231 is closed and the resistor 120 is shorted. A voltage drop across the resistor 120 becomes lower than the threshold set for the disconnection detection. The control circuit 100b performs the disconnection detection in the same manner discussed in the first embodiment section.

The present invention should not be limited to the embodiment previously discussed and shown in the figures, but may be implemented in various ways without departing from the spirit of the invention. For example, a bipolar transistor or other type of switching components may be used for the switching circuit 130, 230. The switching circuit 230 may be constructed of the transistor 130a and resistors 130b, 130c used in the first embodiment shown in FIG. 1.

Figure 5:
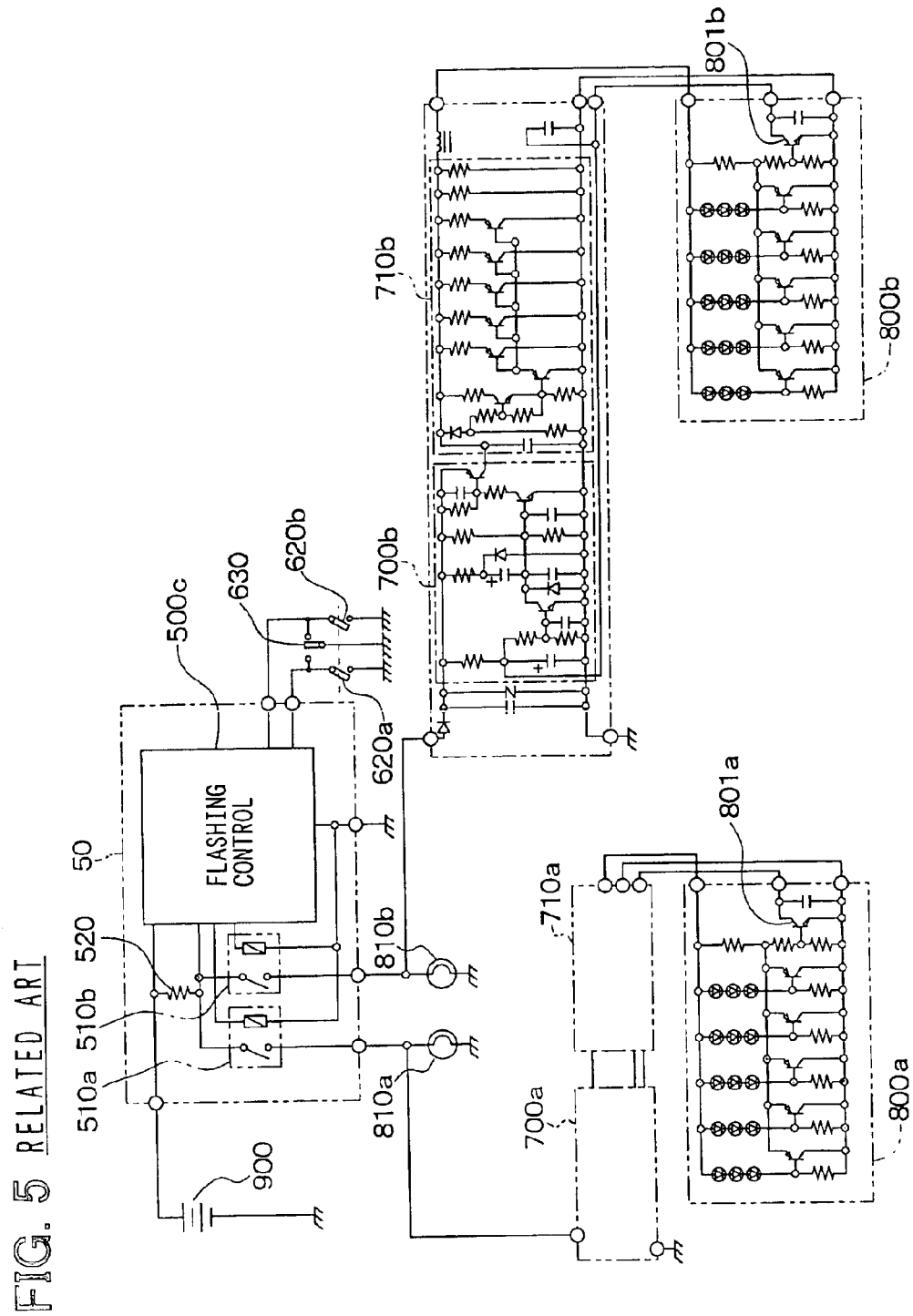
FIG. 5 is a circuit diagram of a vehicular turn signal indicator system according to a related art.

The power supply to the LED lamps 85a, 85b may be shut off using the current shutoff circuits 700a, 700b shown in FIG. 5 when the disconnection signal is outputted from at least one of the LED lamps 85a, 85b. The disconnection detecting circuits shown in FIG. 5 may be used for the above embodiments together with an inverter circuit for inverting a logic level of the disconnection signal that is outputted at a high level.

What is claimed is:

1. A vehicular turn signal indicator system comprising:

a first indicator lamp constructed of a light bulb;

a second indicator lamp constructed of light emitting diodes and a disconnection detecting circuit for detecting disconnection of the light emitting diodes and outputting a disconnection signal indicative of the disconnection of the light emitting diodes; and a flasher circuit that intermittently supplies currents to the first and the second indicator lamps for flashing the first and the second indicator lamps, wherein the flasher circuit includes, a driving means that drives the first and the second indicator lamps to flash by supplying currents thereto, a current detecting resistor connected in a power supply line of the first and the second indicator lamps, a flashing control circuit that performs flashing control of the first and the second indicator lamps by outputting a flashing signal to the driving means during driving of the first and the second indicator lamps, detects a voltage drop across the current detecting resistor, and determines disconnection of at least one of the first and the second indicator lamps if the voltage drop is equal to or under a predetermined threshold value, and a shorting circuit that shorts across the current detecting resistor according to the disconnection signal outputted from the second indicator lamp for lowering the voltage drop equal to or under the threshold value.

2. The vehicular turn signal indicator system according to claim 1, wherein the shorting circuit includes a switching component connected in parallel with the current detecting resistor and turned on by the disconnection signal for shorting across the current detecting resistor.

3. The vehicular turn signal indicator system according to claim 1, wherein the shorting circuit includes an electromagnetic relay connected in parallel with the current detecting resistor and turned on by the disconnection signal for shorting across the current detecting resistor.

4. A flasher circuit for a vehicular turn signal indicator system that has a first indicator lamp constructed of a light bulb and a second indicator lamp constructed of light emitting diodes and a disconnection detecting circuit for detecting disconnection of the light emitting diodes and outputting a disconnection signal, comprising:

a driving means that drives the first and the second indicator lamps to flash by supplying currents thereto;

a current detecting resistor connected in a power supply line of the first and the second indicator lamps;

a flashing control circuit that performs flashing control of the first and the second indicator lamps by outputting a flashing signal to the driving means during driving of the first and the second indicator lamps, detects a voltage drop across the current detecting resistor, and determines disconnection of at least one of the first and the second indicator lamps if the voltage drop is equal to or under a threshold value, and a shorting circuit that shorts across the current detecting resistor according to the disconnection signal outputted from the second indicator lamp for lowering the voltage drop equal to or under the threshold value.

* * * * *